(12) United States Patent
Murakami

(10) Patent No.: US 9,984,026 B2
(45) Date of Patent: May 29, 2018

(54) CIRCUIT, PARALLEL COMPUTING DEVICE, COMPUTER SYSTEM AND COMPUTER READABLE STORAGE MEDIUM

(71) Applicant: Nakaikegami Koubou Co., Ltd., Tokyo (JP)

(72) Inventor: Ryuji Murakami, Tokyo (JP)

(73) Assignee: Nakaikegami Koubou Co., Ltd., Tokyo (JP)

( * ) Notice: Subject to any disclaimer, the term of this patent is extended or adjusted under 35 U.S.C. 154(b) by 382 days.

(21) Appl. No.: 14/708,306

(22) Filed: May 11, 2015

(65) Prior Publication Data

US 2016/0335217 A1    Nov. 17, 2016

(51) Int. Cl.
| G06F 13/36 | (2006.01) |
| G06F 15/16 | (2006.01) |
| G06F 13/40 | (2006.01) |
| G06F 13/42 | (2006.01) |
| H04L 29/08 | (2006.01) |

(52) U.S. Cl.
CPC ...... *G06F 13/4027* (2013.01); *G06F 13/4282* (2013.01); *H04L 29/08072* (2013.01)

(58) Field of Classification Search
USPC ......... 710/104–110, 305–317; 709/201–203, 709/213–216, 249
See application file for complete search history.

(56) References Cited

U.S. PATENT DOCUMENTS

| 5,408,677 A * | 4/1995 | Nogi ................... G06F 15/8092 712/11 |
| 5,613,138 A * | 3/1997 | Kishi ....................... G06F 15/17 710/100 |
| 5,842,035 A * | 11/1998 | Nishikawa .......... G06F 15/8007 712/14 |
| 7,412,586 B1 * | 8/2008 | Rajopadhye ........ G06F 15/8015 712/10 |
| 2008/0294870 A1 * | 11/2008 | Rajopadhye .......... G06F 15/167 712/15 |
| 2009/0013108 A1 * | 1/2009 | Rajamani ............ G06F 13/1684 710/71 |
| 2012/0297092 A1 * | 11/2012 | Wang ..................... G06F 15/16 710/5 |

(Continued)

FOREIGN PATENT DOCUMENTS

| JP | H6-052125 A | 2/1994 |
| JP | H6-075930 A | 3/1994 |

OTHER PUBLICATIONS

Kadota Hiroshi, "Massively Parallel VLSI Computers", Kogyo Chosakai Publishing.

(Continued)

*Primary Examiner* — Raymond Phan

(57) ABSTRACT

Provided is a parallel computing system that has scalability and is capable of performing data transfer between desired PEs. Also provided is a computer system that utilizes the parallel computing system described above, and enables radiosity processing on small-scale mobile terminal devices. An HXNet is implemented in a VLSI, and data transfer between VLSIs is possible using additional BMs. Scalability is realized that enables selection of any number of VLSIs, and radiosity processing is enabled on small-scale mobile terminal devices.

10 Claims, 3 Drawing Sheets

(56) References Cited

U.S. PATENT DOCUMENTS

| 2013/0262718 | A1* | 10/2013 | Vasudevan | H04L 49/90 |
| | | | | 710/54 |
| 2015/0261474 | A1* | 9/2015 | Vorbach | G06F 3/0647 |
| | | | | 710/52 |
| 2015/0286467 | A1* | 10/2015 | Khan | G06F 5/12 |
| | | | | 710/310 |
| 2016/0140061 | A1* | 5/2016 | Mukherjee | G06F 13/1673 |
| | | | | 710/310 |

OTHER PUBLICATIONS

H.Kadota et al, "Parallel Computer ADENART—Its Architecture and Application—", ICS '91 Proceedings of the 5th international conference on Supercomputing, the United States, ACM, 1991, pp. 1-8.

T.Nogi, "Promising Data Parallel Environment—ADEPS, ADETRAN & ADENA", Proceedings, First Aizu International Symposium on Parallel Algorithms / Architecture Synthesis, 1995., the United States, IEEE, Mar. 17, 1995, pp. 45-53.

Office Action issued for counterpart Japanese Application 2013-235925, issued by the Japan Patent Office dated Jun. 20, 2014.

* cited by examiner

CIRCUIT, PARALLEL COMPUTING DEVICE, COMPUTER SYSTEM AND COMPUTER READABLE STORAGE MEDIUM

CROSS-REFERENCE TO RELATED APPLICATIONS

This application has a corresponding Japanese Application No. 2013-235925 filed in JP on Nov. 14, 2013, priority of which is not claimed, the contents of which are incorporated herein by reference.

BACKGROUND

1. Technical Field

The present invention relates to a VLSI circuit for parallel computing, a parallel computing system that utilizes this VLSI circuit, and a computer system that utilizes this parallel computing system.

2. Related Art

A parallel computing system that aims to increase processing speed by performing processing in parallel has been developed through decades of research. In the parallel computing system, a plurality of processing elements known as PEs (corresponding to the CPU) are used, and each PE performs processing independently and transfers data concerning the processing results to other PEs. Here, a transfer bus is necessary for the data transfer, and therefore it is not easy to construct hardware for processing that requires a large amount of data to be transferred.

For example, when calculating the numerical solution to a differential equation representing the diffusion of a substance, i.e. performing radiosity processing, it is only necessary that each PE perform processing for one spatial coordinate and transfer data to the PEs performing processing for adjacent coordinates, which includes four PEs when working in two dimensions and six PEs when working in three dimensions, and therefore a configuration can be used that does not increase the number of buses. However, for the radiosity process in image processing performed by a mobile terminal device such as used in recent years, when each PE performs processing in a small plane, there is a possibility that data will need to be transferred between all of the PEs. Therefore, sufficiently high-speed processing cannot be realized with a conventional parallel computing system.

One method for solving this problem of data transfer between the PEs includes using a parallel computing system that has a communication network for realizing dedicated data transfer, such as disclosed in Patent Document 1, for example. However, construction of such a communication network incurs a significant cost.

Furthermore, Patent Document 2 discloses a parallel computing system that adapts memories corresponding respectively to PEs arranged two-dimensionally for a bus with three or more ports, and performs broadband data transfer through the third port that has exceeded two dimensions. However, the specific method for realizing data transfer with the third port must be designed specifically for each case.

A computing system using HXNet, such as described in Non-Patent Document 1, is known as a parallel computing system in which it is possible to arrange PEs two-dimensionally and perform data transfer between desired PEs. This data transfer between desired PEs is realized by, in a case where there are $m^2$ PEs represented as PE (i, j) ($1 \le i \le m$ and $1 \le j \le m$), performing data transfer in the order of PE (i, j)→PE (j, k) PE→(k, l). HXNet is a useful system with guaranteed implementation.

On the other hand, the number of PEs in HXNet is limited to $m^2$, and it is impossible to form a larger HXNet by combining a plurality of HXnets. Therefore, there is no scalability that enables the small size to be enlarged at a later point.

Patent Document 1: Japanese Patent Application Publication No. H06-052125

Patent Document 2: Japanese Patent Application Publication No. H06-075930

Non-Patent Document 1: Kadota Hiroshi, "Massively Parallel VLSI Computers", Kogyo Chosakai Publishing

SUMMARY

Therefore, it is an object of an aspect of the innovations herein to solve the above problems by providing a parallel computing system that has scalability and is capable of performing data transfer between desired PEs. It is also an objective to provide a computer system that utilizes the parallel computing system described above, and to enable radiosity processing on small-scale mobile terminal devices. These objectives can be achieved by combinations described in the claims.

A miniaturized HXNet is realized by a VLSI circuit. The VLSI circuit includes a buffer memory (BM) that is used in the HXNet and also includes an additional BM for transferring data to another VLSI circuit. In this way, a desired number of VLSI circuits can be combined to form a parallel computing system, and data transfer is possible between desired PEs.

According to a first aspect of the present invention, provided is a VLSI circuit comprising an HXNet including $m^2$ PEs and $m_3$ BMs, and $m^2(n-1)$ additional BMs.

The HXNet is implemented in the VLSI, and additional BMs are further implemented for data transfer with another VLSI. Here, m and n are integers greater than or equal to 2.

According to a second aspect of the present invention, provided is a parallel computing device comprising p VLSI circuits ($p \le n$), the additional BMs include $m^2$ groups of (n−1) additional BMs that are capable of writing from an i-th PE (i is an integer less than or equal to $m_2$) of the HXNet, the (n−1) additional BMs, which form each group of additional BMs, are given an ordering, and a k-th additional BM of an i-th additional BM group of a j-th circuit is readable by an i-th PE of a k-th circuit (if k<j) or a (k+1)-th circuit (if k≤j).

The bus that is the destination for the data transfer from each additional BM may be checked, and the number of buses between the VLSIs may be reduced.

In the parallel computing system, with PE (k, i) representing an i-th PE of a k-th circuit, data transfer from PE ($k_1$, $i_1$) to PE ($k_2$, $i_2$) may be: (1) performed by the HXNet within a $k_1$-th circuit, if $k_1=k_2$, (2) performed by the PE ($k_1$, $i_1$) writing data to a prescribed additional BM and a PE ($k_2$, $i_1$) reading the written data, if $k_1 \ne k_2$ and $i_1=i_2$, and (3) performed by the PE ($k_1$, $i_1$) writing data to a prescribed additional BM, the PE ($k_2$, $i_1$) reading the written data, and the HXNet within a $k_2$-th circuit transferring the written data to a PE ($k_2$, $i_2$), if $k_1 \ne k_2$ and $i_1 \ne i_2$.

A specific data transfer procedure is provided.

According to a third aspect of the present invention, provided is a computer system comprising a main CPU, the parallel computing device described above, and an interface circuit for the main CPU and the parallel computing device.

From the point of view of the main CPU, the parallel computing system realized by the VLSI can be treated as a single device.

The computer system may perform radiosity processing using the parallel computing system.

In the radiosity processing, there is a large amount of data transferred between the PEs. In this case, the computer system of the present invention is efficiently utilized.

The computer system may on a mobile terminal device, and may perform radiosity processing for an image display of an application.

The parallel computing system has scalability, and therefore it is believed that the parallel computing system will be used by small-scale mobile terminal devices, particularly in gaming devices.

As a result of the above, provided is a parallel computing system that is capable of data transfer between PEs and has scalability, and a computer system that utilizes this parallel computing system. The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention. The following embodiments of the present invention are examples in which m=2 and n=3. Operation is performed in a similar manner for other values of m and n.

Figure 1:
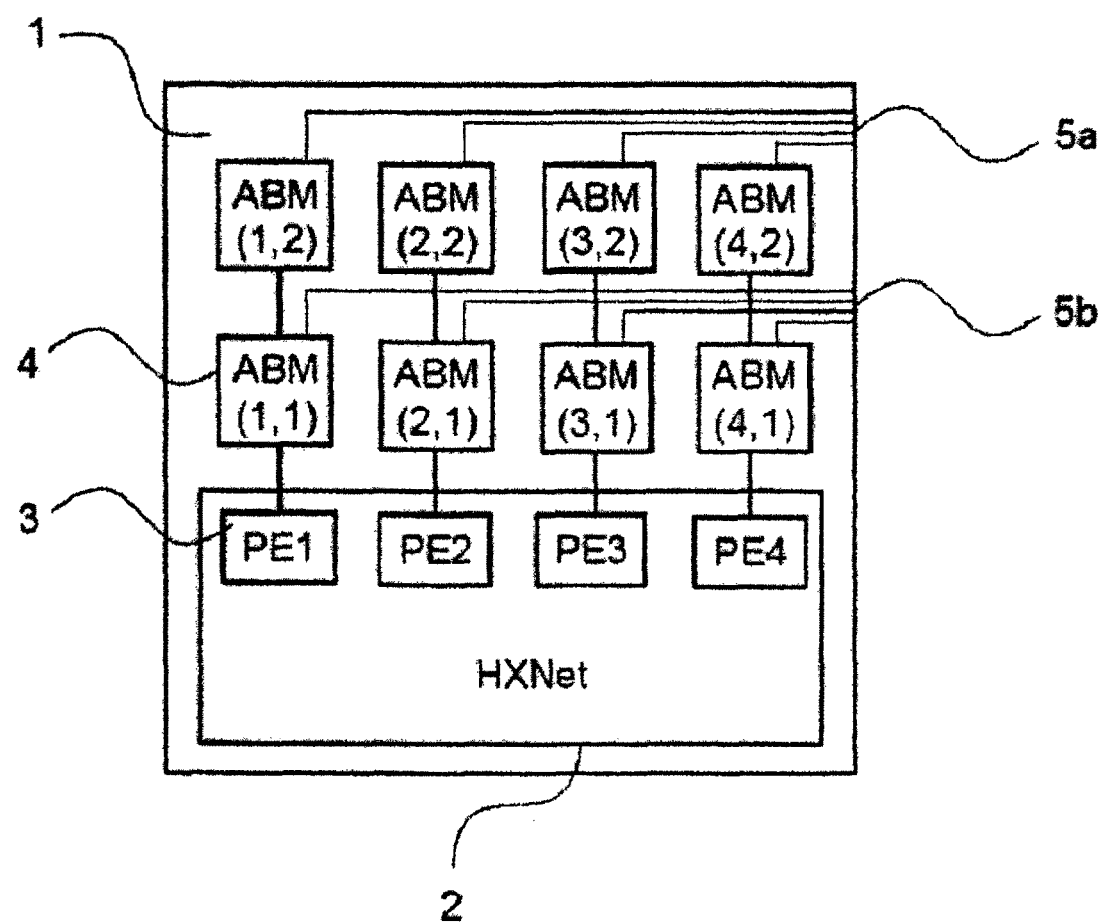
FIG. 1 shows a VLSI circuit.

FIG. 1 shows a VLSI circuit. In the VLSI circuit 1, an HXNet 2 and eight additional BMs (ABMs) 4 are implemented. The HXNet 2 includes four ($=2^2$) PEs 3 and eight ($=2^3$) BMs. The VLSI circuit 1 includes another eight ABMs. The eight ABMs are provided such that there are two ABMs capable of reading from and writing to each of the four PEs (i), and these ABMs are represented as ABM (i, j) (i=1, . . . , 4 and j=1, 2).

The eight ABMs are grouped according to the j value (according to the order of each PM (each j value) and not according to each PR written to or read from (each i value)), and each group has a bus. It is obvious that each ABM actually has an individual bus, but each group has buses with substantially the same direction (the route to the outside of the VLSI circuit).

One VLSI circuit forms an HXNet made from four PEs, and this VLSI circuit itself operates as a parallel computing system. The present embodiment is an example using four PEs, but there may instead be 9, 16, 25, or any other desired number of PEs (as long as the number of PEs is $m^2$, where m is an integer of 2 or more).

Figure 2:
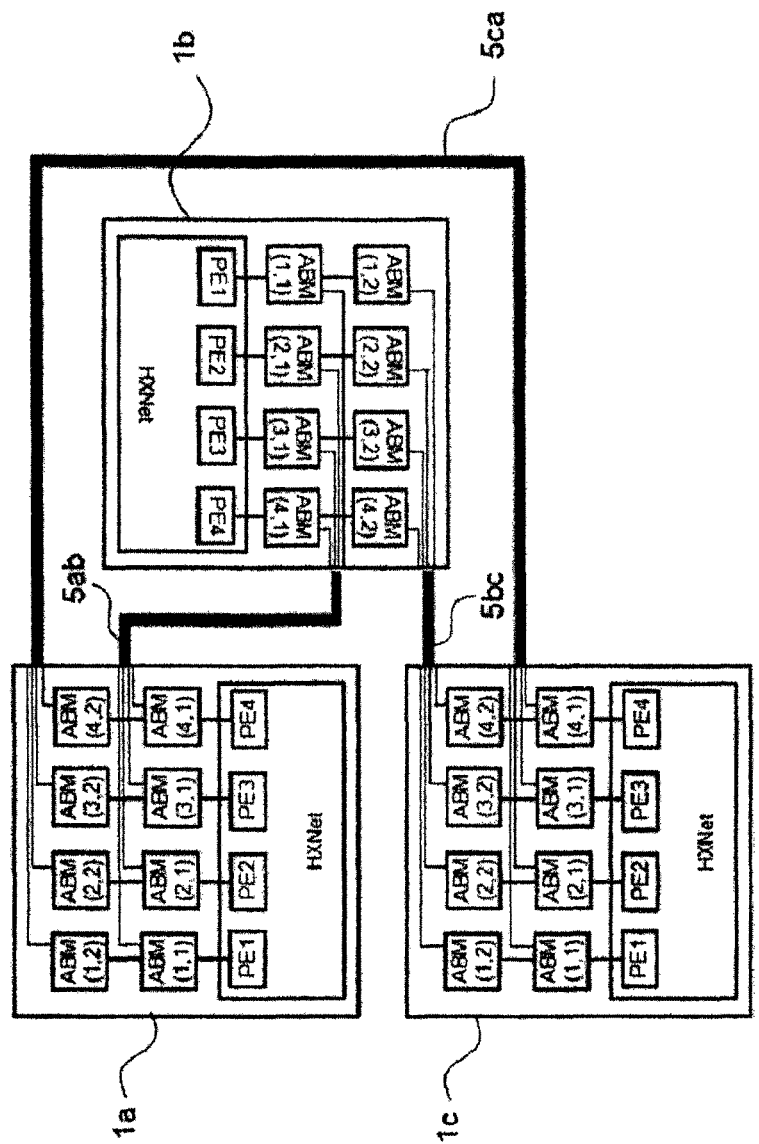
FIG. 2 shows a parallel computing system realized by a plurality of VLSI circuits.

FIG. 2 shows a parallel computing system realized by a plurality of VLSI circuits. The present embodiment is an example of a parallel computing system with 12 PEs (4 PEs×3) realized by three VLSI circuits 1, but a parallel computing system realized by four or more VLSI circuits 1 can be constructed in the same manner.

The three VLSI circuits include VLSI circuits 1a, 1b, and 1c, and there is a bus 5ab connecting VLSI circuits 1a and 1b, a bus 5bc connecting VLSI circuits 1b and 1c, and a bus 5ca connecting VLSI circuits 1c and 1a.

The busses 5ab, 5bc, and 5ca each represent a collection of four buses corresponding respectively to four ABMs. Each of these individual buses is connected in the following manner. For example, in the bus 5ab, the bus from the ABM (1, 2) of the VLSI circuit 1a is connected to the ABM (1, 1) of the VLSI circuit 1b and/or to the PE 1. When connecting from the ABM ($i_1$, $j_1$) of one VLSI circuit to the ABM ($i_2$, $j_2$) of another VLSI circuit or to the PE $i_2$, a relationship of $i_1=i_2$ is maintained. In this way, the connection is made to a PE with the same number or to the ABM corresponding thereto.

Here, data may be copied between ABMs connected by buses, i.e. mirroring between ABMs may be performed, or data may be transferred to the PE without overwriting the ABM that is the connection destination. The objective is to transfer data to the PE, and whether this transfer takes place through an ABM is not the most significant point.

It is important to maintain the relationship of $i_1=i_2$. In the HXNet, the number of PEs is $m^2$ and the PEs are numbered according to the i and j values that have values from 1 to m, and therefore when transferring data from the PE (i, j) to the PE (j, k), the PE (j, k) exists regardless of the j value. However, in the present invention, when the number n of VLSI circuits is less than m, there is a possibility that a "j-th VLSI" will not exist for a j-th PE of an i-th VLSI. The data transfer from PE (i, j) to PE (j, k) is not ensured. Therefore, by using i to order the PEs in each of the VLSIs, the existence of the PE that is the transfer destination is ensured.

As a result of the above, a desired number of VLSI circuits 1 in which are implemented $m^2(n-1)$ additional BMs can be connected with scalability, up to a maximum of n VLSI circuits, and data transfer can be realized between desired PEs. The following describes the data transfer between desired PEs. With PE (k, i) representing the i-th PE of the k-th VLSI circuit, the data transfer from PE ($k_1$, $i_1$) to PE ($k_2$, $i_2$) is performed in the following manner.

If $k_1=k_2$, then the data transfer is performed by the HXNet within the $k_1$-th VLSI circuit. In other words, this is data transfer by an HXNet within a single VLSI.

If $k_1 \neq k_2$ and $i_1=i_2$, then the PE ($k_1$, $i_1$) writes data to a prescribed additional BM and this data is read by the PE ($k_2$, $i_1$). In other words, it is possible to transfer data through the ABM and bus between PEs having the same i-th order within each VLSI.

If $k_1 \neq k_2$ and $i_1 \neq i_2$, then the PE ($k_1$, $i_1$) writes data to a prescribed additional BM, this data is read by the PE ($k_2$, $i_1$), and this data is transferred to the PE ($k_2$, $i_2$) by the HXNet within the $k_2$-th VLSI circuit. In other words, after data transfer is performed through the ABM and the bus, data transfer is performed by the HXNet within the VLSI that is the transfer destination.

The above describes VLSI circuits and the connection therebetween. The following describes an interface circuit for realizing a parallel computing system. It should be noted that the interface circuit may be the same as the interface circuit disclosed in Non-Patent Document 1, and can be developed using common technical knowledge in the field relating to the present invention without requiring a specialized description.

Figure 3:
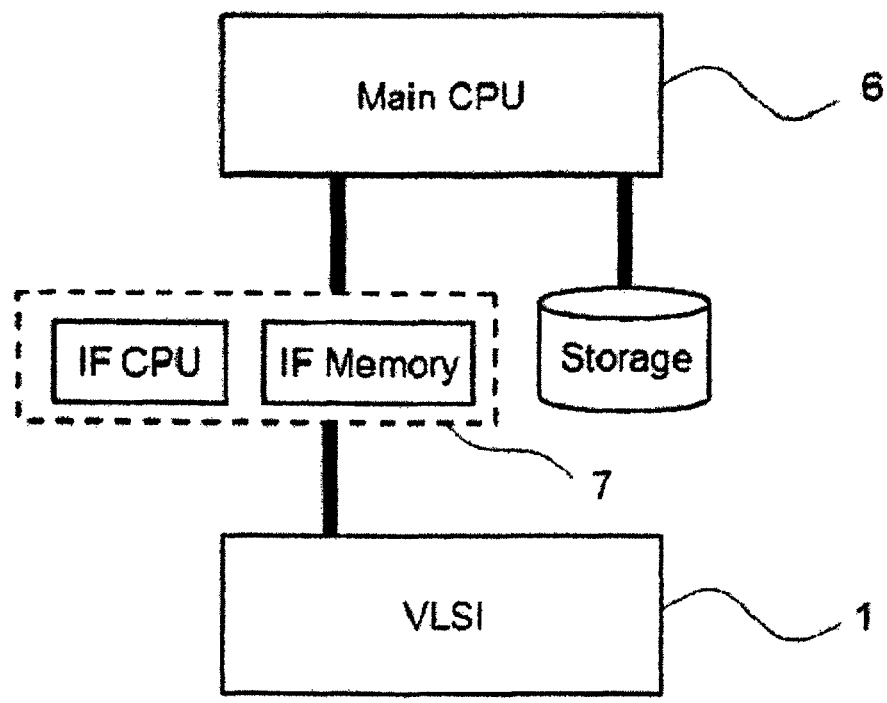
FIG. 3 shows a configuration of a computer.

FIG. 3 shows a configuration of a computer. The computer includes a main CPU 6 and a VLSI circuit 1 for parallel computing, which are connected by an interface circuit 7. Here, there is only one VLSI circuit 1, but a plurality of VLSI circuits may be connected in the manner described above.

The interface circuit 7 can be treated as one input/output device by the main CPU 6, in the same manner as a data storage. This is because the interface circuit 7 is a device that provides some type of data and receives some type of data.

The interface circuit 7 receives data (including program instructions) from the main CPU 6, causes the VLSI circuit 1 to perform parallel computing, and returns the processing results to the main CPU 6. Therefore, an IF memory that stores data and an IF-CPU that controls the operation of the VLSI circuit 1 are provided. According to the program instructions received from the main CPU 6, the interface 7 provides each PE of the VLSI circuit 1 with data and instructs the PEs to perform processing.

The above describes a computer that can perform parallel processing. The following describes the radiosity processing that is performed by this computer.

The radiosity processing is processing to obtain an image, and unlike conventional ray tracing, is characterized by processing according to a relationship between reflection in a small plane representing the surface of an object and another small plane, without tracing each individual ray.

With $R_x$ representing the reflectivity of the x-th small plane, $F_{xy}$ representing the angular relationship between the x-th small plane and the y-th small plane (the ratio of the light reflected by the x-th small plane that reaches the y-th small plane), $B_x$ representing the light energy radiated from the x-th small plane, and $E_x$ representing the initial light energy radiation, the expression shown below is established. Here, $R_x$ and $F_{xy}$ may be different according to color, in which case calculation may be performed for each color.

$$B_x = E_x + R_x \sum_y F_{xy} B_y \qquad \text{Expression 1}$$

Here, $R_x$ is a constant determined according to the material of the object surface, and $E_x$ is a constant determined according to the initial radiated light (light source). The calculation of $F_{xy}$ and $B_x$ is at the heart of the radiosity processing.

Figure 4:
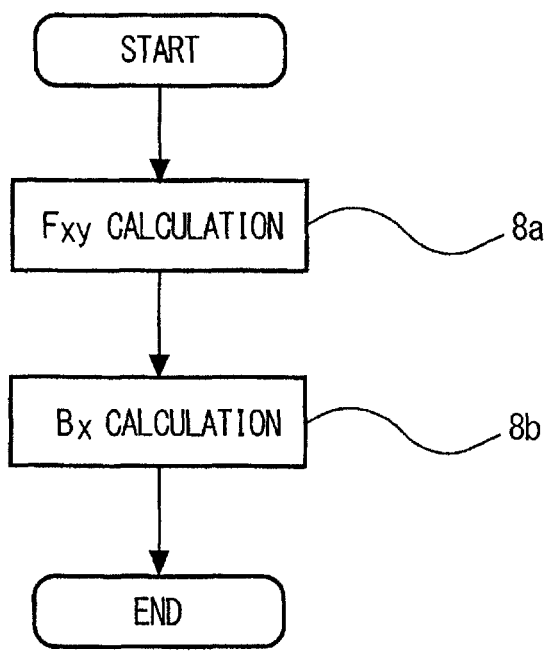
FIG. 4 shows the steps in the radiosity processing.

FIG. 4 shows the steps in the radiosity processing. First, $F_{xy}$ is calculated, and then $B_x$ is calculated. Parallel processing is efficient for step 8a of calculating $F_{xy}$ and step 8b of calculating $B_x$.

Since $F_{xy}$ is the angular relationship between the x-th small plane and the y-th small plane, $F_{xy}$ can be calculated based only on information relating to the x-th small plane and the y-th small plane. In other words, with p representing the number of small planes, the value of $F_{xy}$ can be calculated as p(p−1)/2, and each calculation can be performed independently in parallel. With the parallel computing system including $m^2 n$ PEs, the calculation time is expected to be $(1/m^2 n)$.

For calculating $B_x$, there is a method that includes sequential calculation based on Expression 1 above (the calculation results on the right side are substituted into the left side) and a method that includes an inverse matrix calculation with Expression 1 described above as a linear simultaneous equation.

When performing sequential calculation, $B_x$ for each x can be calculated independently from other values dependent on x. Parallel processing is efficient for this calculation.

When performing the inverse matrix calculation, parallel processing can be efficiently utilized by using the method recorded in Non-Patent Document 1. Here, the majority of $F_{xy}$ values are non-zero values and the matrix that is the target of the inverse matrix calculation is dense, and therefore parallel processing has a significant effect.

As described above, a parallel computing system with scalability is realized, in which it is possible to use any number of VLSI circuits of HXNets that each have $m^2$ PEs. Furthermore, a computer system utilizing this parallel computing system and the radiosity processing performed by this computer system are shown. Furthermore, utilization of this parallel computing system by a mobile terminal device is realized.

The parallel computing system according to the present embodiment has scalability, and therefore it can be used by a small-scale mobile terminal device (in which case VLSI circuits with a small m value are used), a large-scale computing device (in which case VLSI circuits with large m and n values are used), and other devices such as gaming devices.

A parallel computing system with scalability in which data transfer is possible between desired PEs and a computer system that utilizes this parallel computing system are realized. This technology is expected to be used by many mobile terminal device manufacturers and computer manufacturers.

Furthermore, radiosity processing can be realized by a mobile terminal device and the like, and this technology is expected to be used by many software developers.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A parallel computing device comprising:
   n circuits that each include an HXNet having $m^2$ PEs and $m^2(n-1)$ additional BMs, wherein
   m and n are integers greater than or equal to 2,
   in each of the circuits, the additional BMs include $m^2$ groups of (n−1) additional BMs that are capable of writing from each of the $m^2$ PEs of the HXNet,
   the $m^2$ groups of additional BMs are given an ordering, whereby a PE that is capable of writing to an i-th additional BM is represented as an i-th PE, where i is an integer greater than or equal to 1 and less than or equal to $m^2$,
   the (n−1) additional BMs, which form each group of additional BMs, are given an ordering, and
   a k-th additional BM of an i-th additional BM group of a j-th circuit is readable by an i-th PE of a k-th circuit (if k <j) or a (k+1)-th circuit (if k ≤j).

2. The parallel computing device according to claim 1, wherein
with PE (k, i) representing an i-th PE of a k-th circuit, data transfer from a PE ($k_1$, $i_1$) to a PE ($k_2$, $i_2$) is:
(1) performed by the HXNet within a $k_1$-th circuit, if $k_1 = k_2$,
(2) performed by the PE ($k_1$, $i_1$) writing data to a prescribed additional BM and the PE ($k_2$, $i_1$) reading the written data, if $k_1 \neq k_2$ and $i_1 = i_2$, and
(3) performed by the PE ($k_1$, $i_1$) writing data to a prescribed additional BM, the PE ($k_2$, $i_1$) reading the written data, and the HXNet within a $k_2$-th circuit transferring the written data to the PE ($k_2$, $i_2$), if $k_1 \neq k_2$ and $i_1 \neq i_2$.

3. A computer system comprising:
a main CPU;
the parallel computing device according to claim 1; and
an interface circuit for the main CPU and the parallel computing device.

4. A computer system comprising:
the parallel computing device according to claim 1; and
a device that displays processing results of the parallel computing device.

5. A computer-readable storage medium storing thereon instructions that, when executed by a processor, cause the parallel computing device according to claim 1 to perform an operation, wherein
with PE (k, i) representing an i-th PE of a k-th circuit, data transfer from a PE ($k_1$, $i_1$) to a PE ($k_2$, $i_2$ is:
(1) performed by the HXNet within a $k_1$-th circuit, if $k_1 = k_2$,
(2) performed by the PE ($k_1$, $i_1$) writing data to a prescribed additional BM and the PE ($k_2$, $i_1$) reading the written data, if $k_1 \neq k_2$ and $i_1 = i_2$, and
(3) performed by the PE ($k_1$, $i_1$) writing data to a prescribed additional BM, the PE ($k_2$, $i_1$) reading the written data, and the HXNet within a $k_2$-th circuit transferring the written data to the PE ($k_2$, $i_2$), if $k_1 \neq k_2$ and $i_1 \neq i_2$.

6. The computer system according to claim 3, wherein radiosity processing is performed using the parallel computing device.

7. The computer system according to claim 4, further comprising:
an interface circuit that is connected to the parallel computing device, and transmits information relating to processing results of the parallel computing device to the outside and/or receives processing results obtained from the processing of another computer system from the other computer system.

8. The computer system according to claim 6, wherein
the computer system operates on a mobile terminal device, and
radiosity processing is performed for an image display of an application.

9. The computer system according to claim 7, further comprising:
a storage device that stores information relating to processing results of the parallel computing device and/or processing results of another computer system.

10. The computer system according to claim 8, comprising:
a mobile terminal device that includes the main CPU, the parallel computing device, and the interface circuit.

* * * * *